United States Patent [19]

Tani et al.

[11] Patent Number: 5,244,536

[45] Date of Patent: Sep. 14, 1993

[54] METHOD OF MANUFACTURING PLATINUM TEMPERATURE SENSOR

[75] Inventors: Hiroji Tani; Teppei Kubota; Kazuto Miyagawa, all of Kyoto, Japan

[73] Assignee: Murata Manufacturing Co., Ltd., Japan

[21] Appl. No.: 901,373

[22] Filed: Jun. 19, 1992

[30] Foreign Application Priority Data

Jul. 3, 1991 [JP] Japan .................................. 3-162559

[51] Int. Cl.⁵ ............................. C23F 1/00; B44C 1/22
[52] U.S. Cl. .................................. 156/643; 156/659.1; 156/664; 156/901; 29/620; 204/192.32
[58] Field of Search ...................... 156/659.1, 643, 664, 156/902, 901; 29/620, 621, 621.1; 204/192.32, 192.35, 192.34; 338/306

[56] References Cited

U.S. PATENT DOCUMENTS 4,248,688  3/1981  Gartner et al. ................. 204/192.34
4,624,138  11/1986  Ono et al. .......................... 29/620 X
4,805,296  2/1989  Jinda et al. ............................ 29/620

Primary Examiner—William A. Powell
Attorney, Agent, or Firm—Ostrolenk, Faber, Gerb & Soffen

[57] ABSTRACT

A method of manufacturing a platinum temperature sensor includes the step of obtaining a meandering resistive circuit by forming grooves in a platinum film which is provided on an insulating substrate. In order to provide a high resistance value by reducing the line width of the resistive circuit, as well as to miniaturize the platinum temperature sensor, this method comprises steps of forming a resist film on the platinum film provided on the insulating substrate, patterning the resist film by photolithography, and using the patterned resist film as a mask to finely work the platinum film by Ar+ ion etching for forming the grooves. Due to formation of such grooves, the platinum film defines a meandering pattern portion which provides the resistive circuit.

7 Claims, 3 Drawing Sheets

# METHOD OF MANUFACTURING PLATINUM TEMPERATURE SENSOR

BACKGROUND OF THE INVENTION

Field of the Invention

The present invention relates to a method of manufacturing a platinum temperature sensor comprising a platinum film which is formed on an insulating substrate, and more particularly, it relates to an improvement in a method for miniaturizing such a platinum temperature sensor.

Description of the Background Art

A platinum temperature sensor comprises a platinum film which is formed on an insulating substrate of alumina, for example. In order to attain a high resistance in a platinum temperature sensor with a small size, a platinum film is formed in a meandering pattern on an insulating substrate of a limited size, thereby increasing the line length provided by the platinum film. In order to implement such meandering extension, a method advantageously employed comprises forming a platinum film entirely or substantially along the overall surface of an insulating substrate, and forming grooves in the platinum film to perpendicularly pass through the same, so that the portion of the platinum film remaining after the grooves are formed meanders along the insulating substrate.

FIGS. 4(a) to 4(d) illustrate steps in such a conventional method of manufacturing a platinum temperature sensor.

First, an insulating substrate 1 of alumina which is 99.6% in purity, for example, is prepared as shown in FIG. 4(a). A platinum film 2 is formed on the insulating substrate 1 by printing, sputtering or vacuum deposition. The platinum film 2 is 1.0 to 2.0 $\mu$m in thickness, for example.

Then, a YAG laser beam, for example, is applied to form grooves 3 in the platinum film 2 as shown in FIG. 4(b), so that the remaining portion of the platinum film 2 meanderingly extends on the insulating film 1. In this stage, the resistance value provided by the platinum film 2 is adjusted. Thus, the platinum film 2 defines a meandering pattern portion 4 for serving as a resistive circuit, and outlet portions 5 continuously extending from respective ends thereof.

Then, a glass coating film 6 of borosilicate glass, for example, is formed on the meandering pattern portion 4, while electrodes 7 of gold or silver-platinum, for example, are formed on the outlet portions 5, as shown in FIG. 4(c).

Then, wire bonding is applied onto the electrodes 7 to bond lead wires 8 of Pt-Ni clad wires or gold wires, for example, as shown in FIG. 4(d). Then, glass coating films 9 are applied to cover the lead wires 8, the electrodes 7 and the outlet portions 5, in order to ensure fixation of the lead wires 8.

In order to miniaturize such a platinum temperature sensor while ensuring that the resistance value provided by the meandering pattern portion 4 will remain in excess of a desired value, it is necessary to maximize the line length of the meandering pattern portion 4 which is defined by the platinum film 2 a limited area, which extends over while minimizing its line width. When the meandering pattern portion 4 is defined by forming the grooves 3 as shown in FIG. 4(b), reduction of its line width naturally leads to an increase of its line length.

In the laser application method which is employed for forming the grooves 3 in the aforementioned step shown in FIG. 4(b), however, the minimum possible line width of the meandering pattern portion 4 is about 15 $\mu$m at best. SUMMARY OF THE INVENTION

SUMMARY OF THE INVENTION

Accordingly, an object of the present invention is to provide a method of manufacturing a platinum temperature sensor, which can further reduce the line width of a resistive circuit defined by platinum film.

In order to form grooves in a platinum film which is provided on an insulating substrate for defining a resistive circuit, the present invention comprises the steps of forming a resist film on the platinum film, patterning the resist film by photolithography, using the patterned resist film as a mask for finely working the platinum film by Ar+ ion etching, and then removing the resist film.

The resist film which is patterned by photolithography is used as a mask to finely work the platinum film by Ar+ ion etching, whereby it is possible to form the grooves at extremely small intervals for defining a resistive circuit having an extremely small line width of about 7 $\mu$m, for example. In this case, it is also possible to increase the line length of the resistive circuit which is defined by the limited area platinum film.

According to the present invention, therefore, it is possible to obtain a platinum temperature sensor, which can provide a resistive circuit capable of providing a high resistance value, from a platinum film of a limited area. Thus, the platinum temperature sensor can be miniaturized while ensuring a resistance value in excess of a desired value.

Due to such miniaturization of the platinum temperature sensor, further, it is possible to reduce the area of the platinum film. Consequently, the platinum film can be reduced in thermal capacity, so that the platinum temperature sensor is improved in thermal response to a temperature change which takes place at its surface.

According to the present invention, the resistance value provided by the platinum temperature sensor can be increased, in addition to the effect of miniaturization. Thus, it is possible to attain a large amount of output voltage change (dynamic range) by employing the platinum sensor in a bridge circuit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

FIGS. 1(a) to 1(e) illustrate respective steps which are included in a method of manufacturing a platinum temperature sensor according to an embodiment of the present invention.

Figure 1A:
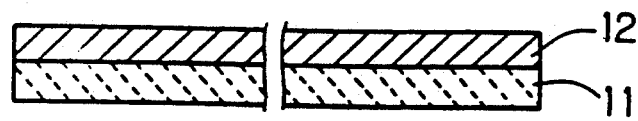
FIGS. 1(a) to 1(e) are sectional views illustrating respective steps included in a method of manufacturing a platinum temperature sensor according to an embodiment of the present invention.

First, an insulating substrate 11 of alumina which is 99 6% in purity, for example, is prepared as shown in FIG. 1(a). A platinum film 12 is formed on this insulating substrate 11 by printing, sputtering or vacuum deposition, for example. This platinum film 12 is 1.4 to 2.0 μm in thickness, for example.

Figure 1B:
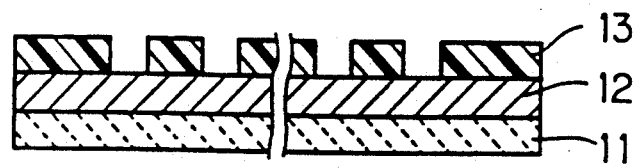

Then, a resist film 13 is formed on the platinum film 12, and patterned by photolithography, as shown in FIG. 1(b).

Figure 1C:
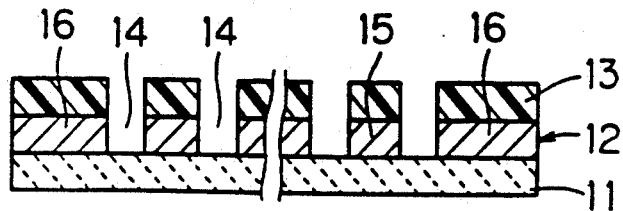

Then, the patterned resist film 13 is used as a mask to finely work the platinum film 12 by Ar+ ion etching as shown in FIG. 1(c). Such an Ar+ ion etching step is carried out under an atmosphere of 100% argon in a vacuum of $10^{-4}$ Torr, with ion energy of 500 to 600 eV at room temperature for 30 to 40 minutes, for example. Thus, grooves 14 are formed in correspondence to the patterns of the resist film 13, and perpendicularly pass through the platinum film 12. Consequently, the platinum film 12 defines a meandering pattern portion 15 and outlet portions 16 which are continuously connected to respective ends of the meandering pattern portion 15.

Figure 1D:
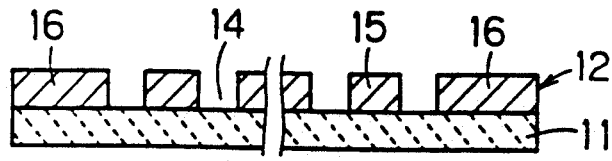
Figure 2:
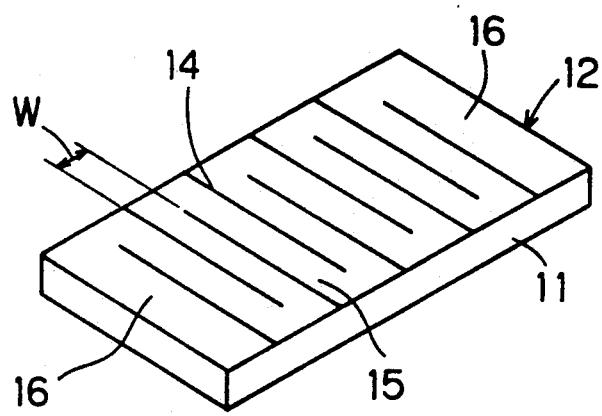
FIG. 2 is a perspective view showing a structure obtained in the step shown in FIG. 1(d)

Then, the resist film 13 is removed as shown in FIG. 1(d). FIG. 2 is a perspective view showing a structure obtained in this step. It is understood from FIG. 2 that the platinum film 12 which is provided on the insulating substrate 11 defines the meandering pattern portion 15 and the outlet portions 16 due to the grooves 14 formed therein.

Figure 1E:
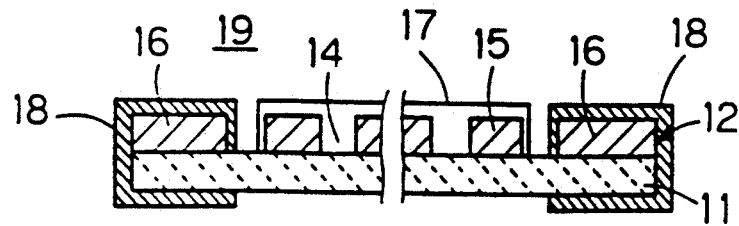

Then, a glass coating film 17 of borosilicate glass, for example, is formed to cover the meandering pattern portion 15, as shown in FIG. 1(e). Further, external electrodes 18 are formed on the outlet portions 16. The external electrodes 18 are made of a metal such as Ag, Ag-Pt, Ag-Pd or Au. Alternatively, the external electrodes 18 may have multilayer structures, with lower layer portions of Pt or Ni thin films which are in contact with the outlet portions 16 defined by the platinum film 2. The external electrodes 18 are formed to extend not only along the outlet portions 16 but toward the lower surface of the insulating substrate 11.

According to the platinum temperature sensor 19 having the structure shown in FIG. 1(e), it is possible to attain electrical continuity to the exterior on end surfaces and lower surfaces of the insulating substrate 11 through the external electrodes 18. Such external electrodes 18 can be directly soldered onto a circuit substrate, in order to mount the platinum temperature sensor 19 thereon. Thus, it is possible to increase the degree of integration of the circuit. Further, such a surface-mountable platinum temperature sensor 19 can be easily introduced into an air flow sensor, for example.

Figure 4A:
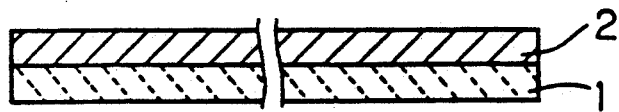
FIGS. 4(a) to 4(d) are sectional views illustrating respective steps included in a conventional method of manufacturing a platinum temperature sensor.
Figure 4B:
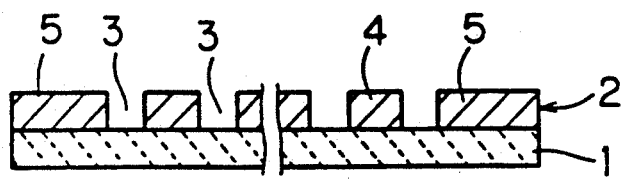
Figure 4C:
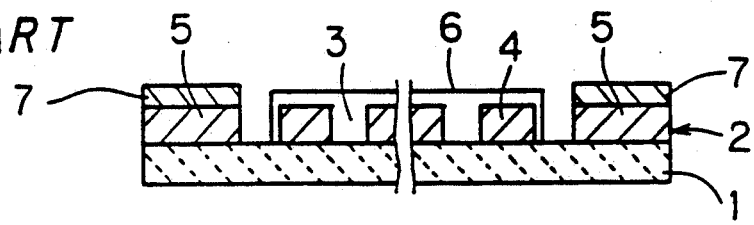
Figure 4D:
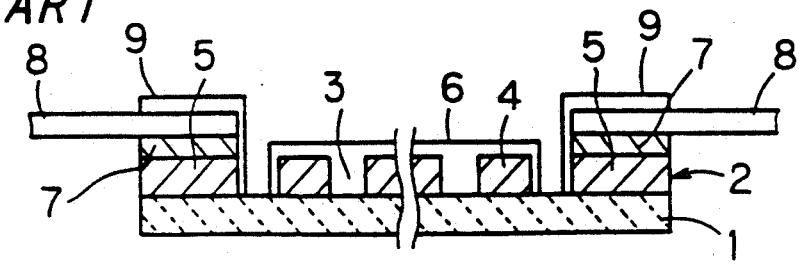

The external electrodes 18 may be replaced by the lead wires 8 shown in FIG. 4(d).

Figure 3:
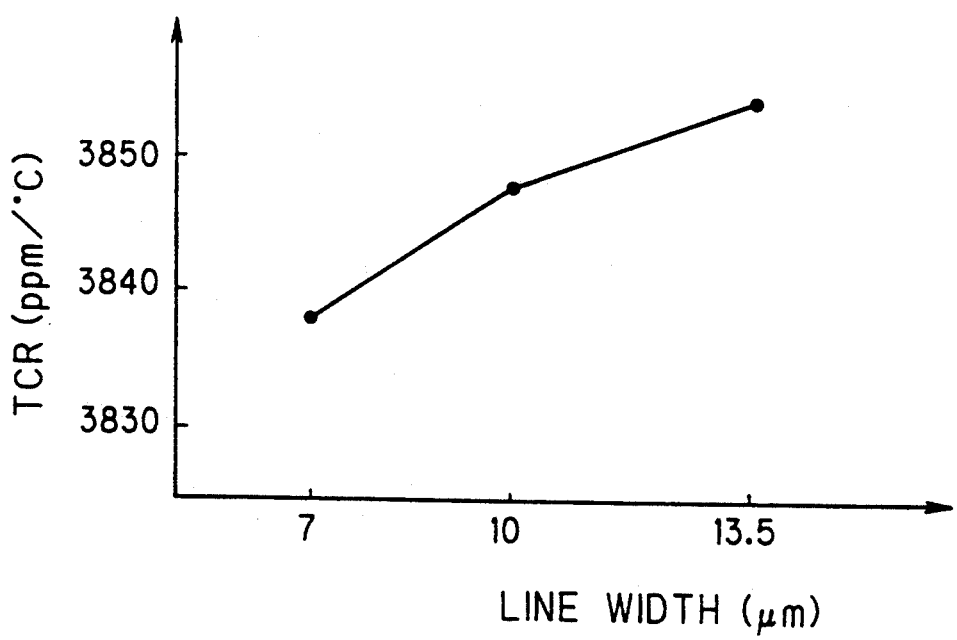
FIG. 3 illustrates relations between line widths of samples obtained by carrying out the method according to the present invention and TCR characteristics thereof.

The method shown in FIGS. 1(a) to 1(e) was carried out in practice, and reduce the line width W (see FIG. 2) of a meandering pattern portion 15 to 7 μm in a platinum temperature sensor 19 of 3.2 mm in length, 1.6 mm in width and 0.63 mm in thickness, for example, thereby attaining a resistance value of 1 kΩ. On the other hand, samples of platinum temperature sensors were prepared by the inventive method with line widths W of 7 μm, 10 μm and 13.5 μm, and subjected to measurement of temperature characteristics (TCR characteristics). FIG. 3 shows the results. It is understood from FIG. 3 that practicable platinum temperature sensors can be obtained by the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a platinum temperature sensor, comprising the steps of:
    forming a platinum film on an insulating substrate;
    forming a resist film on said platinum film;
    patterning said resist film by photolithography;
    using said patterned resist film as a mask for finely working said platinum film by AR+ ion etching; and
    then removing said resist film.

2. A method of manufacturing a platinum temperature sensor in accordance with claim 1, wherein said platinum film is etched to define a meandering pattern portion and outlet portions which are continuously connected to respective ends of said meandering pattern portion in said etching step.

3. A method of manufacturing a platinum temperature sensor in accordance with claim 2, wherein said meandering pattern portion has a line width of about 7 to 13.5 μm.

4. A method of manufacturing a platinum temperature sensor in accordance with claim 1, wherein said platinum film has a thickness of 1.4 to 2.0 μm.

5. A method of manufacturing a platinum temperature sensor in accordance with claim 1, wherein said etching step is carried out in an atmosphere of 100% argon in a vacuum of $10^{-4}$ Torr with ion energy of 500 to 600 eV.

6. A method of manufacturing a platinum temperature sensor in accordance with claim 4, wherein said meandering pattern portion has a line width of about 7 to 13.5 μm.

7. A method of manufacturing a platinum temperature sensor in accordance with claim 1, wherein at least part of said platinum film is finely worked to a width of about 7 to 13.5 μm.

* * * * *